INVENTOR.
SABURO SASAO
BY Fleit, Hohbach, Test Albritton & Herbert
ATTORNEYS

Dec. 2, 1969 SABURO SASAO 3,482,168
DEVICE FOR REMOVAL OF INTERFERING SIGNALS
Filed Nov. 10, 1966 5 Sheets-Sheet 2

INVENTOR.
SABURO SASAO
BY Fidler, Hohbach, Test Albritton & Herbert
ATTORNEYS

INVENTOR.
SABURO SASAO
BY Fleit, Hohbach, Test, Albritton & Herbert
ATTORNEYS

INVENTOR.
SABURO SASAO
BY Fleit, Gipple & Jacobson
Albritton & Herbert
ATTORNEYS Dec. 2, 1969 SABURO SASAO 3,482,168

DEVICE FOR REMOVAL OF INTERFERING SIGNALS

Filed Nov. 10, 1966

5 Sheets-Sheet 5

INVENTOR.
SABURO SASAO
BY Fisher, Hohbach, Test Albritton & Herbert
ATTORNEYS

United States Patent Office 3,482,168

Patented Dec. 2, 1969

3,482,168

DEVICE FOR REMOVAL OF INTERFERING SIGNALS

Saburo Sasao, Osaka, Japan, assignor to Hayakawa Denki Kogyo Kabushiki Kaisha, Osaka, Japan, a corporation of Japan Filed Nov. 10, 1966, Ser. No. 593,441

Claims priority, application Japan, Dec. 20, 1965, 40/79,153

Int. Cl. H04b 1/12

U.S. Cl. 325—476 7 Claims

ABSTRACT OF THE DISCLOSURE

A device for removing false signals from an incoming complex signal consisting of a true signal and a false signal arriving at a later time than the time signal and nearly homologous thereto using a circuit for creating a delayed complex signal having a delay and amplitude equal to that of the false signal and of opposite polarity. The delayed signal is added to the incoming complex signal prior to the delay means to produce cancellation of all false signal products in said complex signal.

Figures 1A, 1B:
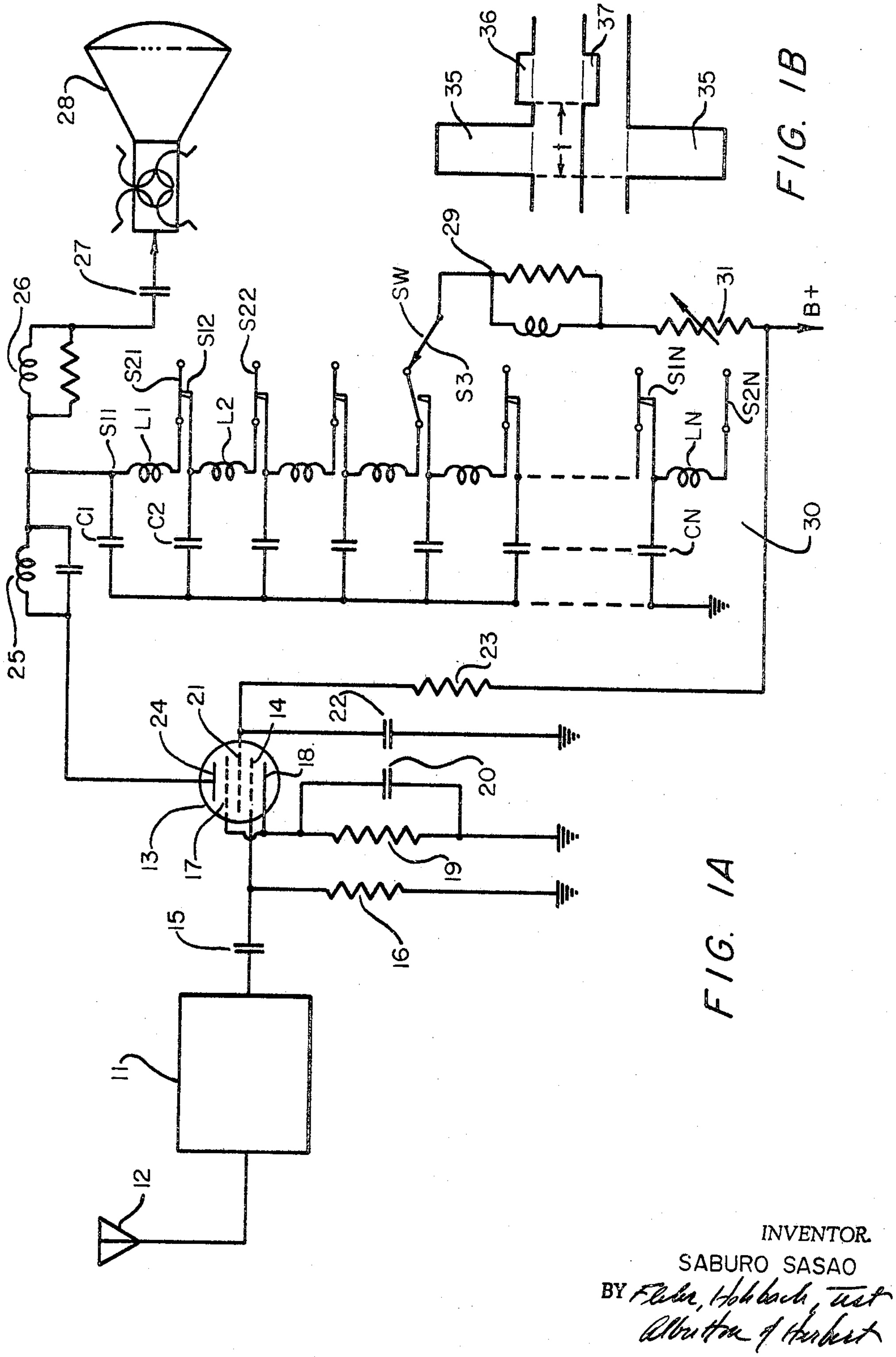

The invention relates in general to a device for removing incoming interfering signals in a communication system and more particularly to a device for removing incoming interfering false signals through a delay circuit operating on the signals comprising the false or interfering signals.

Generally, an electromagnetic wave signal, leaving the transmitting end of a space route of propagation, will arrive at the receiving end of the same not through a single path but through a plurality of paths as different components: a direct wave component and reflected wave components caused by reflection from obstacles present somewhere in said medium of propagation. The reflected wave components are, in many cases, accompanied by a certain time delay, in relation to the direct wave. They jointly provide a resultant signal at the receiving end of the propagation route made complicated and indistinct in relation to the original signal at the starting end. This signal must be handled by the receiver for final signal application.

It should be noted that the greatest difficulty with respect to the above is encountered in cases where the indirect false signal of a reflected wave is put into the receiver at the frequency of the true signal or direct wave and of a waveform quite close to that of the true signal and is applied to the antenna in the same direction as the true signal.

With the condition of the incoming signal described above, both of the true signal and the interfering false signal, so-called echo, are present together at the receiving end of the propagation path, whereby sometimes making the successful discrimination of only the true signal required for good reception from unwanted false signal practically impossible and thus rendering the received information quite unclear and often causing even substantially incorrect reception. Thus, there is a pressing need for successful elimination of false signals for improved reception.

For example, in the particular case of television signal reception, the electromagnetic wave or video signal radiated from the antenna of the transmitting station, is captured by the receiving antenna as a true signal or direct wave together with the echo or reflected wave which is the false signal generated by reflection taking place in the transmission path to the receiving antenna, caused by such obsatcles as the irregular terrain, hills, reinforced concrete buildings, chimneys, towers and the like in the transmission path and accordingly arriving at the receiving antenna after travelling a longer route than the one for the true signal or direct wave.

With a view primarily to preventing all incoming false signals arriving at the receiving antenna to be applied to the receiver, every possible ingenuity is incorporated in the design of the commercially available TV receiving antennas so that they have directivity characteristics which provide the largest possible sensitivity to the true signal, larger enough than the sensitivity to any of the false signals, subject to a certain limit, that the false signal is, in essence, eliminated.

It is, however, to be noted that the known technique of antenna making for TV audio signal reception has still such disadvantage with the respect to the available directivity characteristics that so-called ghost image cannot sometimes be rejected only by the improvement of the antenna's directivity characteristics because of the possibility that the false signal arriving at the receiving antenna arrives in a direction nearly equal to that of the true signal wave, as is often the case.

Lack of a device, in the system or circuit following the receiving antenna of and contained in conventional television receiver, which is capable of discriminating the true signal from co-existing false signal gives rise, in the case of TV video reception, the so-called ghost image caused by the weak false signal. This image is overlapped and slightly deviated from the image resulting from the true signal as seen on the screen of the video cathode ray tube (CRT).

The said ghost image is in no case acceptable. It makes the reading of the letters on the screen intolerably difficult and reduces the reproduction of the details of the figure represented by the image, whereby impairing appreciably the quality of image on the screen. It may even disturb the synchronization of both scannings, horizontal and vertical. Finally, in case of a color television receiver, it provides poor fidelity of chrominance. All of these difficulties are quite intolerable for full enjoyment of black and white and color television.

Of the many types of wireless communication suffering from the above mentioned types of difficulty of interference, those relying eventually only on the auditory sense of the human, because the human being has been, in practice, rendered quite insensitive to the audio-echo and has a good sensing memory, pose no practical problem. Telecommunication covering a very long distance between the ends of communication route and subjected to a large intensity of false signals at the receiving end in relation to the available true signal, pose some problems. Telecommunication of a photoelectrography or facsimile type also are affected by the type of interfering signals described.

The interference by the false signal of the electromagnetic wave arriving at the receiving antenna continuously at a certain time lag in relation to the true signal desired to be received may sometimes be multiplexed with other reflected waves, causing, in the worst case, a plurality of false signals or echoes, some of which are so close to the true signal or direct wave that good reception is no more possible. This is the reason why successful cancellation or removal of said false signal by some means has long been needed.

It is a general object of the present invention to provide a device for removing or cancelling interfering signals in a communication system.

An object of the invention is to provide a means of eliminating false signals in a television receiver, comprising a suitable delaying circuit which generates an internal extra signal from the true signal, having a polarity opposite to and an amplitude equal to the incoming false signal, and is then superposed on the incoming wave representing a composite of true signal and one or more false signals to cancel out the false signals.

Another object of the invention is to provide a means of eliminating a plurality of false signals arriving at the receiving antenna in succession after the true signal of a direct wave and especially those deemed most detrimental to the true signal.

Another object of the invention is to provide a means of eliminating one or more false signals, comprising a suitable delaying circuit having adjustable delay time which generates a delayed signal or signals which serve to cancel the false signal.

Another object of the invention is to provide a simple inexpensive means of eliminating one or more false signals, comprising a suitable delay circuit having a reduced size and a light weight and causing a doubled available delay time as compared with the conventional delaying circuit.

Another object of the invention is to provide a means of eliminating one or more false signals, comprising a suitable delaying circuit characterized by simplicity in construction and ease with which the adjustment is made and capable of generating internally a delayed signal to cancel the false signal by adjusting the polarity and amplitude of the internally generated signal delayed by reflection and made available at the output end thereof.

A further object of the invention is to provide a device of eliminating one or more false signals in a composite signal made up by the first true signal and the second false signal having the nearly same waveform and a time delay relative to said first signal comprising a means for delaying said first true signal by a time equal to said time delay to produce therefrom the third signal having a waveform and amplitude substantially equal to and of opposite polarity to said false signal, a means for mixing the output signal of the delaying circuit with said composite signal at the input end of or ahead of said delaying circuit for elimination of the false signal and a means of making available only the first true signal for eventual utilization.

All of the above mentioned and other objects of the invention may be achieved by causing a delay of the incoming true signal by a given time through a suitable delaying circuit which, for the purpose of the invention, is utilized to cancel the false signal.

A fuller understanding of the invention may be had by referring to the following descriptions taken in conjunction with the accompanying drawings which illustrate the various embodiments of the invention as applied specifically to the television receiver to eliminate the ghost image on the video CRT screen.

Referring to the drawings:

FIGURES 1*a*, 2*a*, 3*a*, 4*a* and 5*a* are circuit diagrams of a means for removing the false signal embodying the invention.

FIGURES 1*b*, 2*b*, 3*b*, 4*b* and 5*b* are waveform diagrams showing the waveforms in various parts of the circuits shown in FIGURES 1*a*, 2*a*, 3*a*, 4*a* and 5*a*, respectively.

Figure 7:
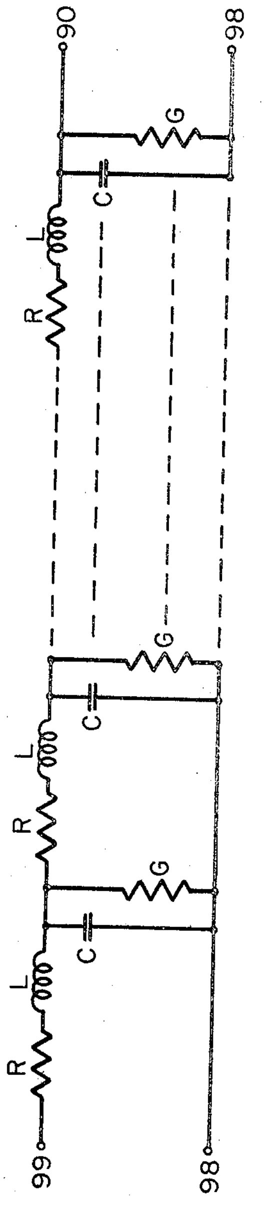
Figure 6:
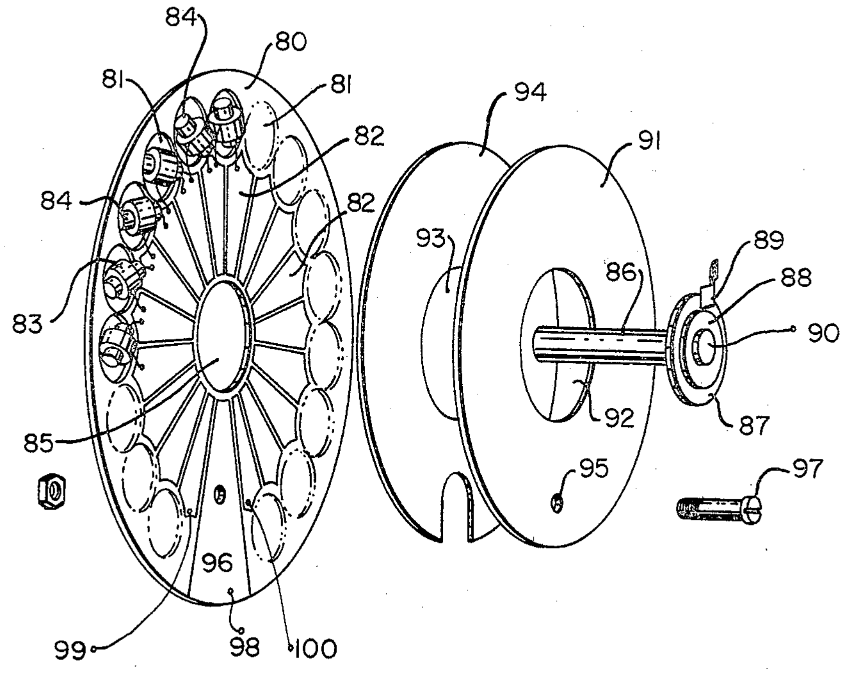
Figures 8A, 8B:
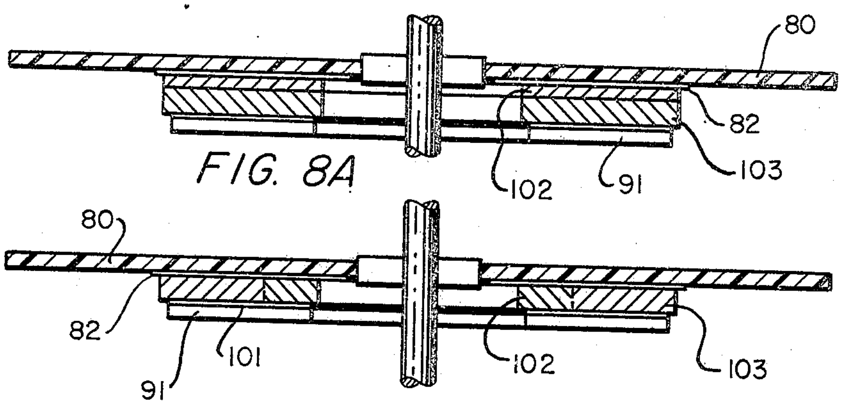

FIGURES 6–8 show particular devices for delaying the input signal or signals.

FIGURE 1*a* shows the circuit diagram of a circuit for removal of the false signal or signals by virtue of the reflection caused in the delay circuit comprising the inductance and capacitance. The circuit is connected in the video output circuit of a television receiver. The circuit 11 is illustrated in block diagram because it corresponds to conventional television receiver circuits wherein the alternating voltage induced between the antenna 12 and the earth by the incoming signal wave is amplified first by a high frequency circuit and then by an intermediate frequency circuit and, at the same time, the composite video signal set up by the synchronizing signal for both vertical and horizontal scanning and the inter-carrier audio signal is taken out through suitable detecting circuits. The composite video output signal, made up of the synchonizing signal, the video signal and the inter-carrier audio signal picked up from the detecting circuit in the previous amplifying circuit of the video amplifier, is applied to the control grid 14 of the electron tube 13 through the coupling condenser 15. The control grid 14 is connected to the ground potential through the leakage resistor 16.

The suppressor grid 17 and the cathode 18 of the electronic tube are connected to the ground potential through the bias resistor 19 and bypass condenser 20. The screen grid 21 is likewise bypassed to the ground through the condenser 22 while being connected to the B+ of the D-C supply through the resistor 23. To the anode 24 of the electronic tube 13 is connected the intermediate frequency trap 25 which, in its turn, is connected to the input terminal of the delay circuit 30 with which adjustment of the delay time of internal reflection can be made, and through the series peaking element 26 and the coupling condenser 27 to the input terminal of the video CRT.

The delay circuit 30 is composed of the coils L1, L2 . . . L*n* and the condensers C1, C2 . . . C*n*, one end of individual coils L1, L2 . . . L*n* being connected to the corresponding fixed contacts S11, S12 . . . **S1*n*** of the switch SW and to ground through the corresponding condenser C1, C2 . . . C*n*, while the other end is connected to the moving contacts S21, S22 . . . **S2*n* of said switch having a sliding contactor S3 for selective contact with any one of said moving contacts S21, S22 . . . S2*n*. The said sliding contactor S3 is in turn connected to the B+ terminal of D-C source voltage through the parallel peaking element 29 and the series variable resistor 31**.

Other separate systems of audio, synchronization, scanning, etc. to be combined with a delay circuit for removal of the false signal according to the invention may be of a conventional construction of a known type and, therefore, description thereof is omitted in this specification.

Operation of the circuit schematically illustrated in FIGURE 1*a* is as follows.

The false signal 36, FIGURE 1*b*, arrives at the antenna of the television receiver a certain time *t* after arrival of the true signal 35.

The false signal 36 results from both the reflection and the diffraction of the electromagnetic wave emanating from the transmitting antenna in the route of travel thereof across the space up to the receiving antenna as well as reflections of the true signal 35 within the previous stage 11 of the video amplifying circuit. The waveform is nearly homologous to that of the true signal 35 but delayed in relation thereto when being applied to the control grid of the electronic tube 13.

Arrival of both the true signal 35 and false signal 36 deriving therefrom and delayed by a certain time in relation thereto at the plate 24 in the output circuit for video amplification, namely the electronic tube 13 first results in the impression of the leading edge of the true signal wave 35 on the input terminal of the video CRT through the intermediate frequency trap 25, series peaking element 26 and the coupling condenser 27 as well as to the delay circuit 30. In this regard, it is to be noted that should the delay time *t* be selected to be equal to the time of one cycle of reciprocation or reflection of the true signal in the delay circuit 30, the delayed signal 37 obtained by the delay circuit 30 and deriving from the incoming true signal wave is superposed on the false signal 36 arriving time *t* later.

By moving contactor S3 of switch SW, it is possible to select the amount of inductance, coils L1, L2 . . . L*n* in series, and capacitance, condensers C1, C2 . . . C*n* which, in turn, determines the delay time to be introduced by the delay circuit 30.

The sliding contactor S3 is adjusted to provide a mismatch as well as a delay. The internal reflection in the delay circuit provides a third signal wave. Assuming that the impedance of the variable resistor 31 connected with the sliding contactor S3 be Z2 and that across and between the moving contact having been contacted by the sliding contactor S3 and the output terminal of the video amplifying circuit the impedance be Z1, the coefficient $\gamma$ of reflection of the true signal waves taking place internally at the connection point between the variable resistor 31 and the delay circuit 30, through which the true signal 35 is allowed to travel, can be expressed by the following formula:

$$\gamma = \frac{Z2 - Z1}{Z2 + Z1}$$

The true signal thus reflected is permitted to go back through the delay circuit 30 and then up to the output terminal of the video amplifying circuit as the third signal 37 represented by a reflected wave. The delay time is expressed by a time required for one cycle of the internal reciprocation or reflection of the true signal 35 within the delay circuit 30, and may be controlled as required by adjustment of the sliding contactor S3 of switch SW. With the said time adjusted to be $t$ corresponding to the delay time of the false signal 36, and the coefficient $\gamma$ of internal reflection in the delay circuit 30 adjusted to be reversed, with respect to polarity, and equal, with respect to amplitude, to the incoming false signal 36, the reflected signal 37 derived from the true signal wave 35 becomes superposed on the false signal 36 allowed to enter into the television receiver. This cancels out the false signal and permits only the true signal 35 to be applied to the input terminal of the video CRT.

In FIGURE 1 is illustrated the wave pattern diagram wherein the true signal 35 and the false signal 36 are of the same polarity. It should, however, be noted that the true signal 35 and the false signal 36 may have opposite polarity, according to the condition of the false signal occurrence for a particular case of video reception.

More specifically, in cases where a difference between the travelling path length of both signals, true 35 and false 36, in the air up to the receiving antenna is nearly equal to one or more times, either an even or odd half wave length of the incoming signal wave, the true signal and the false signal may be either of same or opposite polarity.

Inasmuch as the television broadcasting is generally operated, relying primarily on the use of the horizontally polarized signal waves, the echo of such signal caused by reflection, in the transmission path by an obstacle having a reflection plane parallel to the direction of the polarization of the travelling signal wave, retains the same direction of polarization as that before reflection, thus providing the same polarity for both signal waves, one true 35 and another false 36, while an echo caused by reflection by an obstacle having a reflection plane normal to the direction of polarization of the travelling signal wave is subject to 180° change of phase which means that the polarity of the false signal is opposite to that of the true signal.

Depending on the location and orientation of a particular reflecting obstacle for the signal wave in the air, a plurality of the false signals may be produced by reflection, some of them having the same polarity as the true signal, while the remainder have opposite polarity.

In this case, the coefficient $\gamma$ of reflection as previously defined may be changed accordingly as required case by case by means of the variable resistor 31 which, for this purpose, is capable of changing the amplitude and polarity of the third signal 37 generated by reflection in the delay circuit 30, through a proper change of the impedance Z1 taken in conjunction with the characteristic impedance Z2 of the delay circuit 30.

In FIGURES 2–5 are illustrated other embodiments of the invention which include circuits or devices for eliminating false signals. The cancellation is not achieved by a third signal generated by reflection taking place in the delay circuit 30 comprising the coil L and the condenser C but by the delayed signal travelling through the said circuit 30. Similar reference characters are used in these illustrations for parts equivalent to those appearing in FIGURE 1.

FIGURES 2 and 3 show the different examples of the embodiment of the invention concerning the device for eliminating incoming false signals 36 having a polarity opposite to that of the true signal 35.

In FIGURE 2 the plate terminal of the electron tube 41 is connected to the control grid 44 of another electron tube 43 in the next stage through condenser 42. Grid 44 is connected to ground potential through the leakage resistance 45.

The tube 43 is connected in a cathode follower configuration and supplies its output to electron tube 52 through a delay and impedance matching network. The cathode of the electron tube 43 is connected to the sliding contact of the variable resistor 46. One of the terminals of the resistor is connected to the sliding contactor of delay circuit 30' and another is connected to ground potential. Impedance matching is properly made with resistors 47 and 48 coupled to the inductance of the delay circuit 30'. Output terminal 49 of delay circuit 30' is condenser coupled to the control grid of electron tube 52 through condenser 50. Leakage resistance 51 connects the grid to ground potential.

The cathode of electron tube 52 is connected to the ground potential through variable bias resistor 53 bypassed by the condenser 54. The plate of the tube is connected back to the control grid of electron tube 43 in the previous stage through the condenser 55. The plate of electron tube 43 is connected to the input terminal of the CRT 28 through the intermediate frequency trap 25, the series peaking element 26 and then the condenser 27 and also to the B+ terminal of the D-C source through the parallel peaking coil 29 and load resistance 56.

Figures 2A, 2B:
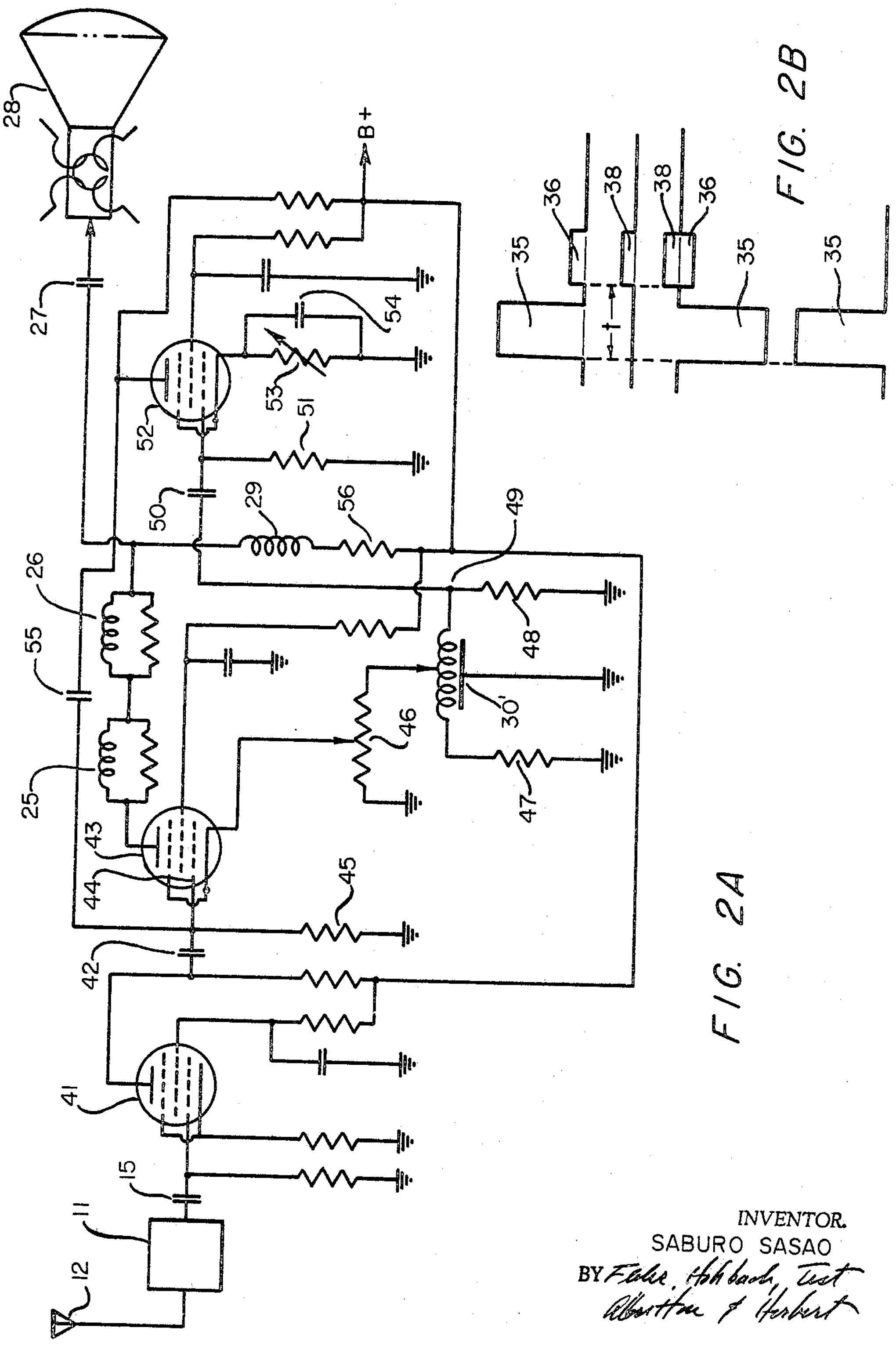

In the case where the true signal 35 and the false signal 36, delayed time $t$ from the true signal as illustrated schematically in FIGURE 2*b*, are applied in succession to the control grid of the electron tube 41, the output voltage resulting therefrom and having the same waveform as the input is subsequently applied to the control grid 44 of the electron tube 43, after being reversed with respect to the polarity.

The control grid 44 having thus been impressed with the true signal 35, the electron tube 43 operates to provide accordingly the output signal through the plate thereof, the waveform of the said output signal being opposite to the input signal in connection with the polarity as schematically shown in the lower section of FIGURE 2*b*.

Said output signal having the described waveform is, in turn, applied to the input terminal of the video CRT 28 through the intermediate frequency trap 25, the series peaking element 26, and finally the coupling condenser 27 to operate said CRT which then gives the image on the screen thereof. At the same time, the output signal of the electron tube 43 having the same waveform and the polarity as the input signal is taken out of the cathode of said tube to be subsequently applied to the sliding contact of the delay circuit 30' after being controlled with respect to the amplitude thereof by means of variable resistor 46.

The delay circuit 30' may be adjusted for impedance matching on both ends thereof by means of the resistor 47 and the resistor 48, respectively, in order to suppress the occurrence of internal reflection and obtain the delay time $t$ as required case by case by means of the sliding contactor. The output signal 38 of the delay circuit 30 obtained through the output terminal 49 thereof and delayed by a time of $t$ in relation to the true signal 35 and having the waveform characterized by a limited amplitude is applied to the control grid of the electron tube 52 to obtain the output thereof having the polarity opposite to the original waveform of the input thereof.

The amplitude of the output signal so obtained from the electron tube 52 may be further controlled with respect to the amplitude thereof by means of the variable resistor 53 connected with the cathode of said tube for feedback of said signal to the control grid of the electron tube 43.

In this way, the internally delayed signal 38 may, by controlling the true signal 35 by means of variable resistors 46 and 53 with respect to the amplitude thereof and reversing with respect to the polarity thereof by means of the electron tube 52 and providing the time delay, *t*, as may be required case by case through the delay circuit 30', be made available at the control grid 44 of the electron tube 43, with the same phase and amplitude and of a polarity opposite to the incoming false signal 36 delayed by a time of *t* in relation to the true signal. The incoming false signal 36 may be eliminated by the so obtained delayed signal 38, whereby allowing the application of only the true signal 35 to the input terminal of the video CRT 28.

In the circuit shown in FIGURE 3 the plate of the electron tube 57 is, as in the circuit illustrated in FIGURE 2, connected to the input terminal of the video CRT 28 through the intermediate frequency trap 25, the series peaking element 26 and the coupling condenser 27 as well as the B+ terminal of the D-C supply through the parallel peaking element 29 and the load resistor 56, the input terminal of the video CRT 28 is connected to the sliding contactor of the delay circuit 30', one end thereof being grounded through resistor 59 utilized for impedance matching and the other end being grounded through the variable resistor 60 designed for impedance matching. A sliding contactor is connected to the second control grid 62 of the electron tube 57 through the coupling condenser 61.

The cathode of the electron tube 57 is connected to ground potential through the variable bias resistor 63 which is bypassed by the condenser 64.

Figure 3B:
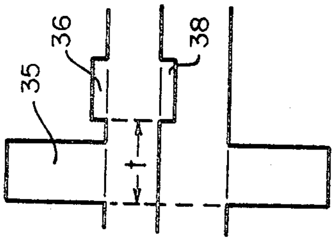

In FIGURE 3, application of both the true signal 35 and the false signal 36, delayed time *t*, after arrival of the true signal 35 as illustrated in the upper section of FIGURE 3*b*, to the first control grid 58 of the electron tube 57 gives rise accordingly first to the output signal having a waveform corresponding to the true signal 35 and characterized by a polarity opposite to the original incoming signals and available at the plate of said tube 57 which, in turn, is applied to the input terminal of the video CRT 28.

The said signal impressed on the input terminal of the video CRT 28 is also applied to the delay circuit 30' wherein the internally delayed signal 38 is developed to be impressed on the second control grid 62 of the electron tube 57 through the coupling condenser 61, the voltage thereof having been divided properly by means of the variable resistor 60.

This means that the incoming false signal 36 applied to the first control grid 58 of the electron tube 57 and the delayed signal 38 impressed on the second control grid 62 of the same are opposite each other with respect to the polarity and delay time *t* of the delayed signal 38 in relation to the true signal 35 may be controlled as required for a particular case by properly operating the sliding contactor in the delay circuit 30' to be rendered equal to the delay time of the false signal 36 in relation to the true signal 35, and the amplitude of said delayed signal 38 may also be adjusted to be equal to that of the false signal 36 by means of the variable resistors 60 and 63.

Therefore, the false signal 36 at the electron tube 57 is completely cancelled within said tube 57 by the delayed signal 38 of the feedback wave deriving from the true signal, thus providing only the true signal 35 for eventual application to the input terminal of the video CRT 28.

In FIGURES 4 and 5 are illustrated other examples of the embodiment of the invention for removal of the incoming false signal 36 having opposite polarity than the true signal. The output terminal of the previous stage 11 is connected, through the condenser 15, to the control grids of the electron tubes 65 and 66 having the leakage resistor 67 connected to the ground potential. The cathode of said electron tubes 65 and 66 are connected to the sliding contactor of variable resistor 69 and then grounded through resistor 68. The variable resistor 69 is also connected to the sliding contactor of the delay circuit 30' and both ends of said circuit 30' are connected to the ground potential through resistors 70 or 71 to provide a means of impedance matching.

On the other hand, the plate of the electron amplifying tube 65 or 66 is connected to the input terminal of the video CRT 28 through the intermediate frequency trap 25, the series peaking coil 26 and finally the coupling condenser 27 and also to the B+ terminal of the D-C source through the parallel peaking coil 29 and the load resistor 56.

Figure 4B:
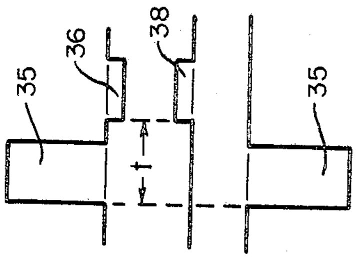
Figure 3A:
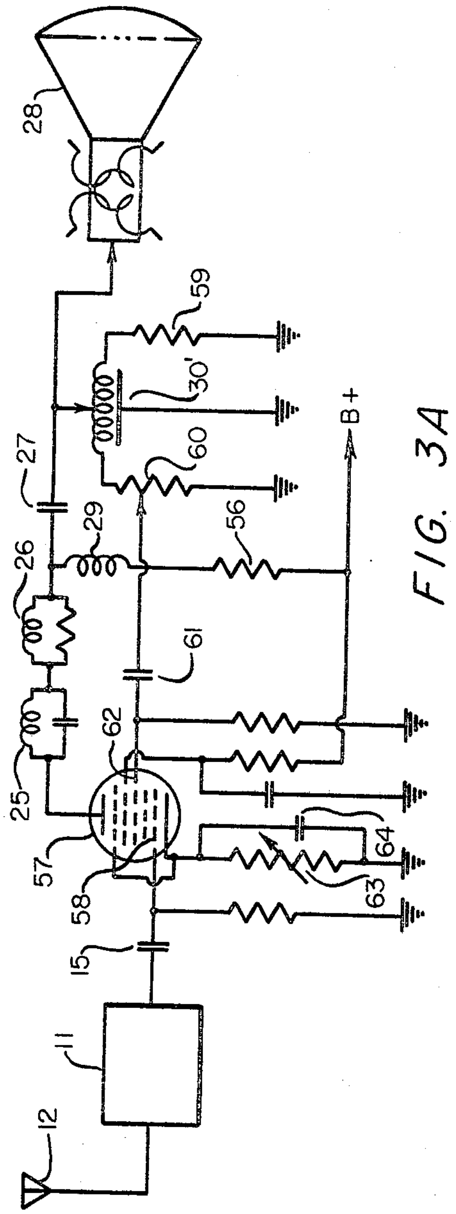
Figure 4A:
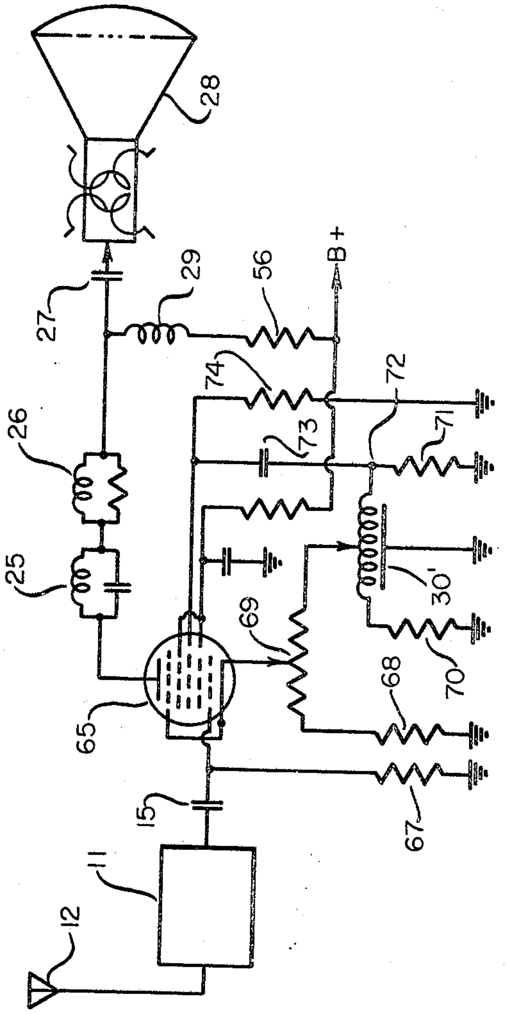
Figures 5A, 5B:
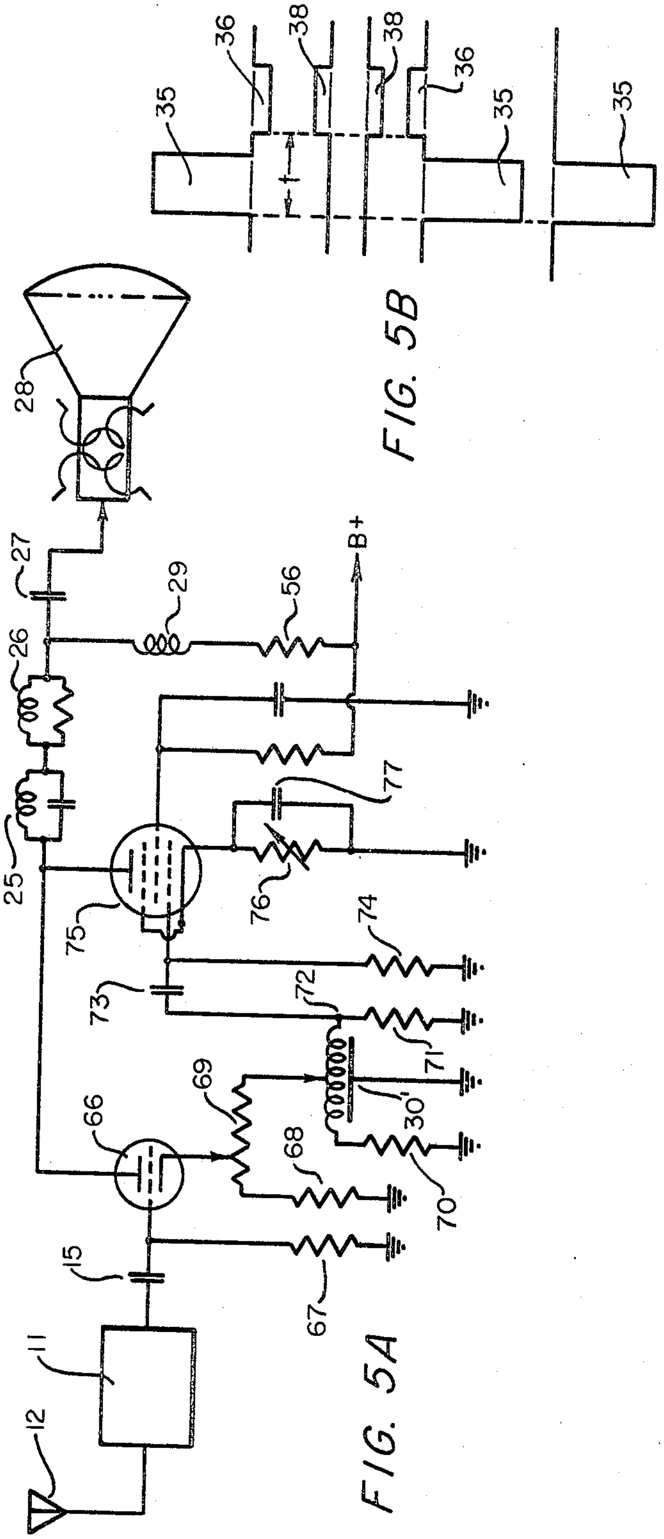

In FIGURE 4*a* the output terminal 72 of the delaying circuit 30 is connected through the coupling condenser 73 to the third control grid of the electron tube 65 having the leakage resistor 74 connected to the ground potential, while in FIGURE 5*a* it is connected to the output terminal 72 of the delaying circuit 30' through the coupling condenser 73 to the control grid of the electron tube 75 having the leakage resistor 74 which, in its turn, is connected to the ground potential. The cathode of tube 75 is also connected to the ground potential through the variable bias resistor 76 and bypassed by the condenser 77. The plate of tube 75 is connected eventually to the CRT 28 together with the plate of tube 66 in the previous stage.

Also in FIGURE 4*a*, application of the true signal 35 and false signal 36 incoming time, *t*, after said true signal and having the polarity opposite to the former signal 35 illustrated in the upper section of FIGURE 4*b* to the control grid of the electron tube 65 gives rise to appearance of a reproduction of the true signal 35 with the polarity thereof having been rendered opposite to that of the original as illustrated in the lower section of FIGURE 4*b* and available at the plate of said tube 65 which, in turn, is applied to the input terminal of the video CRT 28 through the intermediate frequency trap 25, the series peaking coil 26, and finally the coupling condenser 27.

At the same time, the signal representing the original true signal 35 but having the same polarity as said true signal is also made available at the cathode of electron tube 65, and then divided by joint action of the resistor 68 and variable resistor 69. Signal 38 is retarded by an adjustable time as adjusted through the delaying circuit 30' and is available at the output terminal thereof for application to the second control grid of the electron tube 65 through the coupling condenser 73.

The said delayed signal 38 having the polarity opposite to that of the incoming false signal 36 may be made equal to the false signal 36 with respect to the amplitude by properly adjusting with the variable resistor 69, and also be adjusted, by means of the delaying circuit 30', to have a time delay of *t* in relation to the true signal 35. In this way, to the electron tube 65 are applied both signals so made available thereto and as shown in the upper and middle sections of FIGURE 4*b*, and subsequently the false signal 36 is offset by the delayed signal 38 and, therefore, the video CRT can be fed with the true signal only.

In FIGURE 5*a* two different incoming signals, one true 35 and another false 36 arriving in succession at the receiving antenna time *t* after the true signal as illustrated in the upper section of FIGURE 5*b*, are applied to the control grid of the electron tube 66 jointly giving rise to generation of the output signals from said tube 66 available at the plate thereof and having the waveform similar to and the polarity opposite to the applied incoming signal 35 and 36.

At the same time, the cathode of electron tube 66 also provides another output signal having the same polarity as the incoming true signal and is fed, at the plate circuit thereof, through the tube 75 with the delayed signal 38 having been adjusted with respect to the amplitude by means of resistor 68 and variable resistors 69 and 76 and the delay time of $t$ as required through the delaying circuit 30'.

Control of the delay time $t$ and the amplitude of the delayed signal 38 may be achieved, as described above, by properly adjusting with the delaying circuit 30' and variable resistors 69 and 76, respectively, so that said delay time can be equal to the same between the true signal 35 and later false signal 36 and the amplitude of the delayed signal 38 be equal to that of the false signal 36 respectively.

Therefore, in the plate circuit of electron tube 66 are superposed the signals having the waveforms such as the third and fourth from the top in FIGURE 5*b* with each other, meaning practical offset of the false signal by the delayed signal 37, whereby allowing only the true signal 35 as represented by the lowermost waveform in FIGURE 5*b* to be made available in the plate circuit of the electron tube 66.

The disclosure hereinbefore made for the invention deals with only the example of the embodiment wherein the interference is caused by only one false signal of echo in the air, but it need not be specifically mentioned that the described embodiment is essentially also applicable to many other cases where more than one echo, namely false signals, are present and accordingly not limited to the example hereinabove described.

In other words, the embodiment of the invention no doubt may also be had with ease by design of the device for removal of a plurality of the interfering false signals, availing a corresponding plurality of output offsetting signals of the reflected or otherwise delayed wave generated by a corresponding plurality of the delaying circuits or made available through a correspodning plurality of the output terminals of a single delaying circuit.

In FIGURE 6 is illustrated the perspective view of the construction of a delaying device embodying the invention whereby the delay time may be adjusted stepwise for removal of the interfering false signal or signals.

In FIGURE 7 is shown the equivalent network of the delaying circuit corresponding to said device.

In FIGURE 8 is illustrated the cross-sectional view of the capacitor for said delaying circuit for ease of understanding the construction and operating principle thereof.

Generally, the delay time $t$ provided by a four-terminal network comprising the inductance L and the capacitance C may be expressed as a function of the applied frequency, but in a high frequency region, the available delay time becomes substantially dependent not on the said frequency but on the inductance L and capacitance C, in accordance with the following relation:

$$T \doteqdot \sqrt{L \cdot C}$$

In this regard, use of $n$ times the inductance L and capacitance C placed in series with one another in the network gives the available delay time T multiplied accordingly as expressed by the following formula:

$$T \doteqdot n\sqrt{L \cdot C}$$

From the latter relation, it is readily understood that a delay time T provided by an LC circuit may be had as required by properly selecting a value of the inductance L and the capacitance C and/or the number of the coil L to be operated in said circuit.

It is, however, specially noted that the characteristic impedance $Z_0$ of a four-terminal network may be given by $$Z_0 \doteqdot \sqrt{L/C}$$

in cases where the pure resistance component R of the applied coil L and the conductance G of the condenser C are negligibly small, and according an $L/C$ ratio must be adjusted to be unchanged to obtain the characteristic impedance $Z_0$ as required.

In order to assure the unchanged waveform of the input signal for a given four-terminal network free from distortion involved, the condition for the relation $$R/L = G/C$$

must always be complied with.

The delaying circuit according to the invention is capable of providing the characteristic impedance pursuant to above $Z_0$, and meeting, with ease, the requirement for distortionless waveform of the output signal and assures the possibility of adjusting the delay time to any desired value.

In other words, in such delaying circuit comprising the coil and condenser, the inductance L and the series resistance component R of a coil represent the characteristic constant inherent to the coil itself, and are subject to comparatively large limitation of ease of control thereof for the reason of practically available type of the coil material which is usually only copper for the least possible loss and dimension as required of the coil for a particular need, while the capacitance C and conductance G of the condenser may be adjusted as required for a particular frequency range with extreme ease by proper choice of the type, shape and the combination, etc., of the dielectrics to be sandwiched between both electrodes which jointly set up a condenser.

With the above points in mind for making a delaying circuit in accordance with the invention, the condenser is made up in such a construction that the sandwiched dielectrics are readily replaceable for adjustment to provide the characteristic impedance $Z_0$ and meet the requirement for distortionlessness of the circuit in which the condenser is placed. Control of the number or value of the inductance L and the capacitance C to be placed in the four-terminal network representing said delaying circuit is made on the basis of the delay time required.

In FIGURE 6 a required number of holes 81, 81 . . . are provided circumferentially in disc 80 made of such insulating material as Bakelite or the like. Individual electric conductor strips 82, made of copper foil or the like, are arranged radially on the surface of the disc so that each of them is directed between corresponding individual adjacent holes 81 in each of which is installed one bobbin 84 carrying thereon coil 83.

Two coils 83 in adjacent holes have their axes at an angle with respect to each other. One end of such two coils is connected to the electric conductor 82 corresponding to said two coils. This practice of construction is repeated for remainders of every two adjacent coils to cover all the coil-containing holes. Into the center hole 85 provided in the disc is installed a center disc 87 mounted on shaft 86 to allow free rotation thereof. Between the disc 87 and another disc 88 placed face to face coaxially with said disc 87 is mounted the spring brush 89 movable together with said shaft 86, the sliding tip of said brush 89 being kept pressed mechanically to set up an assured electrical contact with the electric conductors 82 and having the lead wire 90.

Disc 91 provided with the center bore 92 and made of such dielectric as Bakelite or the like, one side face thereof having a coaxial electric conductor disc bonded thereto with adhesive, is brought into contact with the side of disc 80 having the electric conductor strips 82. Discs 80 and 91 sandwich therebetween the dielectric disc 94. The dielectric disc 94 may be a plastic film or the like having a center bore 93 of a size nearly equal to that of the center bore 92 of the above mentioned disc 91. The assembly is secured together with one or more bolts 97 applied through the bolt holes 95 and 96. A special size electric conductor strip is bonded fixedly on said one face of the disc 80 and has the lead wire 98 electrically connected with the electric conductor disc mounted on disc 91. The two electric conductor strips 82 on opposite sides of said special size electric conductor strip having the lead wire 98 include conductors 99 and 100.

In FIGURE 7 is illustrated the equivalent network corresponding to the device shown in FIGURE 6. R and L stand for the pure resistance component and the inductance, respectively, of the coils 83. C and G denote the capacitance and conductance of a capacitor built up between the electric conductor on the disc 91 and mating electric conductor strips 82 on the disc 80 having the dielectric disc 94 sandwiched therebetween.

In FIGURE 8 are illustrated the enlarged cross-sections of two different capacitors set up in accordance with the above description. *a* shows an example for the construction of the capacitors differing from the capacitor comprising the dielectrics 94 made of a single material as shown in FIGURE 6 wherein are placed one over another two different dielectrics 102 and 103 of the dissimilar material having the dielectric constant and the dielectric loss as required for a particular band of frequency to be applied being sandwiched between the electric conductor strips 82 and the electric conductor disc 101 on the disc 91. *b* shows another type of capacitor construction with a proper difference of the dielectrics surface area mating with the conductor strips and/or of the dielectric constant and/or the dielectric loss between the two dielectrics 102 and 103 of coaxial ring form so as to provide the capacitance C and the conductance G as required for a particular band of frequency to be applied.

For successful realization of conductance G of the capacitor having the frequency characteristics as desired in conjunction with the capacitance thereof, a plurality of the dielectrics may be placed after careful choice of their type of material, form and combination which best suit a particular delaying circuit.

The delaying circuit according to the above mentioned embodiment of the invention is set up as described previously and has the input terminal represented by the lead wires either 98–99 or 98–100 and the output terminal represented by the lead wires 90–98.

Control of the delay time as required is accomplished by turning properly the sliding brush 89 mounted fixedly on the shaft 86 which may be put into contact with any one of the electric conductors 82, depending on the turning angle of said shaft. When said brush 89 is in contact with the electric conductor strip 82 corresponding to the *n*th coil 83 as counted from the lead wire of the input terminal, the available delay time T becomes as follows:

$$T \doteqdot n \cdot \sqrt{L \cdot C}$$

provided the influence of the applied frequency on the value of T is of the negligible order.

Therefore, an additional turn of the shaft 86 to bring the brush 89 into contact with another electric conductor strip 82 to change properly the number of the working coil 83 which then becomes electrically operable inbetween the output terminal and the input terminal of the delaying circuit gives rise to a corresponding change of *n* in the above mentioned formula to realize another delay time T as required.

The characteristic impedance $Z_0$ may be realized as required first by properly selecting the material of the dielectric to be sandwiched between the working electric conductor strip 82 and the electric conductor disc 101 with joint respect to the dielectric constant and the thickness thereof to determine the available capacitance C which, in turn, defines the available characteristic impedance $Z_0$ depending on the ratio thereof to the inductance L of the coil 83.

For meeting the requirement to assure the distortionless circuit, the proper adjustment of the conductance G of a capacitor set up by total of the working electric conductor strips 82 and the conductor disc 101 is sufficient. For this purpose, the dielectrics may be choiced correctly with respect to the type, form and pattern of combination of the materials to be used for joint use of two different dielectrics having the thickness thereof as required, one 102 having a larger dielectric loss and another 103 having a higher dielectric constant to be placed one over another or with the different surface area of mating as shown in FIGURE 8 which represents as example of the embodiment of the invention whereby providing the capacitance C of said capacitor which assures the above mentioned characteristic impedance $Z_0$ as required for adjustment of the conductance G.

As is clear from the foregoing disclosure, the delaying circuit according to the invention is simple in construction and enables obtaining a delay time as may be required with extreme ease, and the type, thickness or form and combination, etc., of the dielectric materials to be sandwiched between the electric conductor strips 82 and conductor disc 101 may be selected as required, and the dielectric may easily be made of a plurality of similar or dissimilar materials. This results in having the delay time T adjustable, but also the characteristic impedance $Z_0$ is adjustable to a value as required for a particular time delay. Distortionlessness time delaying may be readily realized merely by use of the capacitor C having the frequency-conductance characteristics as required.

It should be noted that the delaying circuit already described previously and illustrated in FIGURES 6–8 is readily applicable, without any modification, for inclusion in the circuits also previously mentioned and shown in FIGURES 2*a*, 3*a*, 4*a* and 5*a*, and may also be included in the circuit illustrated in FIGURE 1*a*, only modification having been done in such a manner that individual coils and condensers shown in FIGURE 6 are electrically isolated from one another and then connected to the corresponding contacts of the switch SW illustrated in FIGURE 1*a*.

Although the descriptions have been made with respect to the principle of the invention with a certain degree of particularity for a device particularly designed for use to remove the ghost image as seen on the video CRT screen of the television receiver, it is understood that the present disclosure has been made only by way of example especially for the delaying circuit having particularly the coils and the condensers, but may expressly be also applicable to all other types of said circuit comprised, for example, in the magneto striction delaying device or the like for use as a delaying means and that numerous changes in the details of construction and arrangement of the parts or other elements may be resorted to without departing from the spirit and scope of the invention as hereinafter claimed.

I claim:

1. In an electrical circuit for carrying a complex signal composed of a true signal and a false signal having a waveform which is homologous to the true signal and delayed in time with respect thereto, delay means connected to said circuit for generating a delayed complex signal therefrom having the same time delay and amplitude of said false signal and having opposite polarity to said false signal, adding means connecting the output of said delay means to the electrical circuit for inserting said delayed complex signal into said circuit at a point preceding the delay means in said electrical circuit so that said false signal is removed from said complex signal before application thereof to said delay means.

2. A device for the removal of incoming false signals as in claim 1 wherein said delay means includes means for reflecting the signal applied thereto to provide at its input a delayed signal having the waveform substantially equal to the incoming signal but of opposite polarity.

3. A device for removal of incoming false signal or signals as in claim 1 wherein said adding means is at the input of said delay means.

4. A device for the removal of a false signal from an incoming complex signal composed of a true signal and a false signal having a waveform which is homologous to that of the true signal and delayed in time with respect thereto, comprising a circuit for carrying said incoming complex signal, delay means connected to said circuit to sample said complex signal and for generating a complex signal delayed by a time equal to said incoming time delay of the false signal, means for adjusting the amplitude, polarity, and delay time of said delayed complex signal to provide a cancellation signal having a waveform substantially equal to that of the false signal or signals but of opposite polarity, adding means connected to couple the delayed signal into said circuit, said adding means preceding said delay means so that said false signal is removed before application to said delay means to thereby add the cancellation signal to the incoming complex signal and to cause removal of the false signal by cancellation, and output means connected to said adding means to provide a true signal.

5. A device as in claim 4 wherein means is provided for adjusting the time delay of the delayed signal and separate means is provided for adjusting the amplitude of the delayed signal.

6. In a television receiver, a circuit for the removal of a false signal from an incoming complex signal composed of a true signal and a false signal having a waveform which is homologous to that of the true signal and delayed in time with respect thereto, comprising a video circuit for carrying said incoming complex signal, delay means connected to said circuit to sample said complex signal and for generating a complex signal delayed by a time equal to said incoming time delay of the false signal, means for adjusting the amplitude, polarity, and delay time of said delayed complex signal to provide a cancellation signal having a waveform substantially equal to that of the false signal or signals but of opposite polarity, adding means connected to couple the delayed signal into said video circuit, said adding means preceding said delay means so that said false signal is removed before application of the signal to said delay means to thereby add the cancellation signal to the incoming complex signal and to cause removal of the false signal by cancellation, and output means connected to said adding means to provide a true signal.

7. A television receiver as in claim 6 wherein said delay means is connected to said video circuit after demodulation of sync and audio.

References Cited

UNITED STATES PATENTS 3,213,450 9/1965 Goor ------------ 325—474 X

KATHLEEN R. CLAFFY, Primary Examiner

D. L. RAY, Assistant Examiner

U.S. Cl. X.R.

328—165